United States Patent
Yamamura

(10) Patent No.: US 10,513,993 B2
(45) Date of Patent: Dec. 24, 2019

(54) TECHNIQUE OF DETECTING INTAKE PRESSURE OF FUEL

(71) Applicant: HONDA MOTOR CO., LTD., Tokyo (JP)

(72) Inventor: Yoichi Yamamura, Wako (JP)

(73) Assignee: HONDA MOTOR CO., LTD, Tokyo (JP)

( * ) Notice: Subject to any disclaimer, the term of this patent is extended or adjusted under 35 U.S.C. 154(b) by 0 days.

(21) Appl. No.: 16/129,834

(22) Filed: Sep. 13, 2018

(65) Prior Publication Data

US 2019/0162133 A1 May 30, 2019

(30) Foreign Application Priority Data

Nov. 29, 2017 (JP) .................................. 2017-229337

(51) Int. Cl.
*F02D 41/18* (2006.01)
*F02D 41/00* (2006.01)
*F02D 41/34* (2006.01)

(52) U.S. Cl.
CPC ......... *F02D 41/009* (2013.01); *F02D 41/182* (2013.01); *F02D 41/34* (2013.01); *F02D 41/0002* (2013.01); *F02D 2700/0235* (2013.01); *F02D 2700/0266* (2013.01)

(58) Field of Classification Search
CPC ........... F02D 41/182; F02D 2200/0406; F02D 2700/0235; F02D 2700/0266
USPC ....................................................... 123/684
See application file for complete search history.

(56) References Cited

U.S. PATENT DOCUMENTS

| 3,032,025 | A | * | 5/1962 | Banks | ...................... F02D 9/00 123/179.17 |
| 9,897,032 | B2 | * | 2/2018 | Sugimoto | ........... F02D 41/1498 |
| 2004/0194765 | A1 | * | 10/2004 | Nakamura | .............. F02D 41/18 123/480 |
| 2004/0244471 | A1 | * | 12/2004 | Sawada | ................... F02D 41/34 73/114.38 |
| 2004/0244773 | A1 | * | 12/2004 | Nakamura | ............... F02D 9/10 123/403 |
| 2011/0288722 | A1 | * | 11/2011 | Nicosia | .............. F02D 41/2422 701/31.4 |
| 2017/0175660 | A1 | * | 6/2017 | Pursifull | ............. F02D 41/0002 |

FOREIGN PATENT DOCUMENTS

| JP | 2009-191712 A | 8/2009 |
| JP | 2009-191713 A | 8/2009 |

* cited by examiner

Primary Examiner — Erick R Solis
(74) Attorney, Agent, or Firm — Thomas | Horstemeyer, LLP

(57) ABSTRACT

An intake pressure sensor is provided in an intake path of a single cylinder engine and detects an intake pressure. A crank angle sensor detects a crank angle of the single cylinder engine. A sampling unit samples the intake pressure detected by the intake pressure sensor when the crank angle detected by the crank angle sensor becomes a sampling start angle. A calculation unit extracts M intake pressures of relatively small values of N intake pressures sampled by the sampling unit. The calculation unit acquires, as a bottom pressure, an average value of P intake pressures remaining after several intake pressures of relatively large values and several intake pressures of relatively small values of the M intake pressures are excluded.

9 Claims, 5 Drawing Sheets

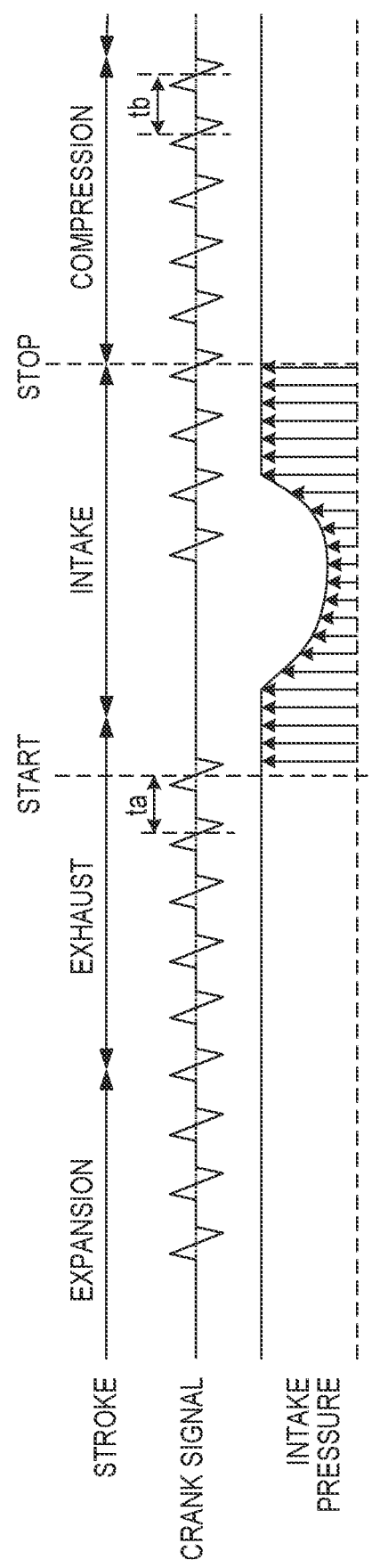

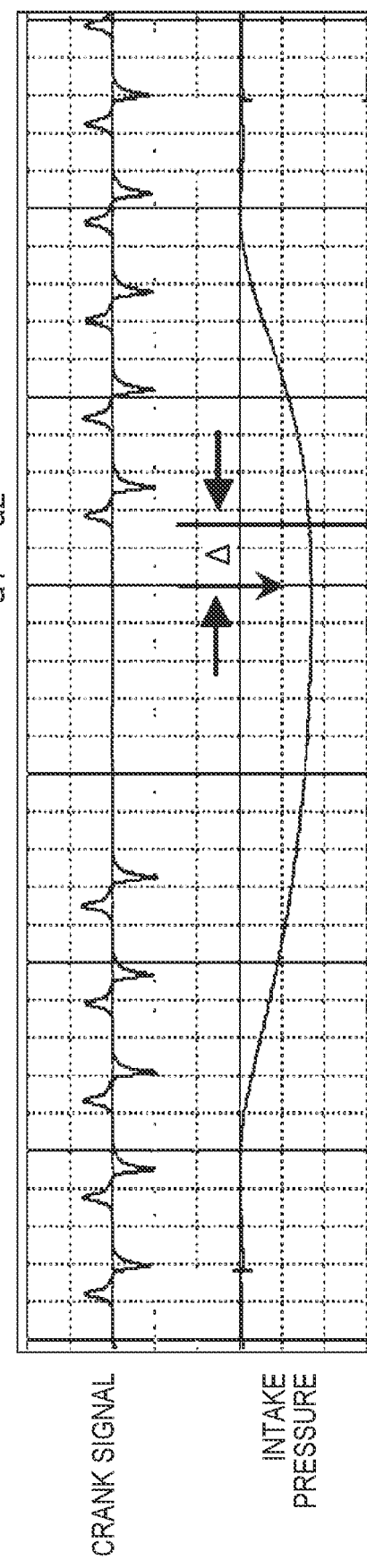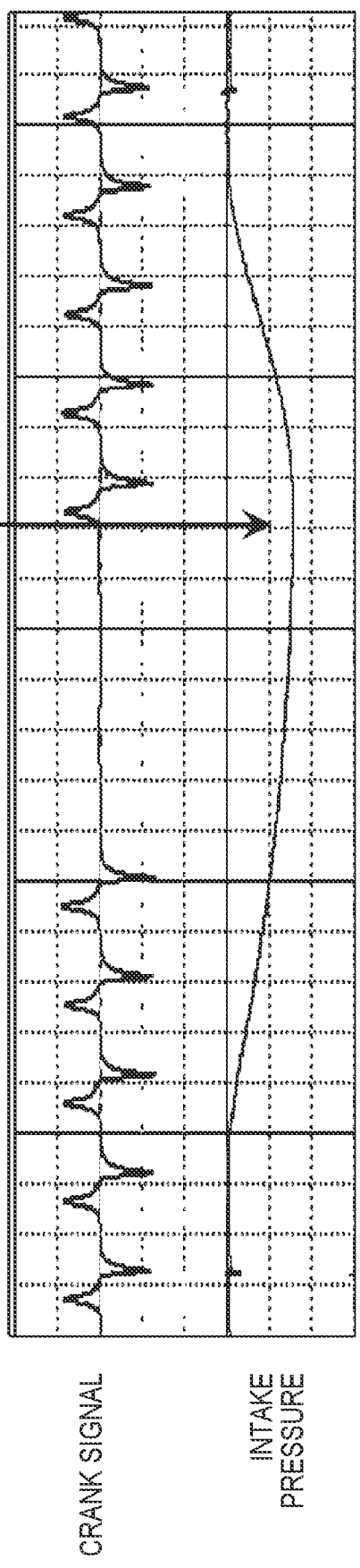

TECHNIQUE OF DETECTING INTAKE PRESSURE OF FUEL

BACKGROUND OF THE INVENTION

Field of the Invention

The present invention relates to a technique of detecting the intake pressure of fuel, and particularly to an intake pressure detection apparatus and an electronically controlled fuel supply apparatus.

Description of the Related Art

Fuel injection control of a gasoline engine includes speed-throttle control and speed-density control. In the speed-throttle control, an intake air amount is estimated based on a throttle opening and an engine speed, the intake air amount is corrected in accordance with an intake temperature or an air fuel ratio, and a fuel injection pulse width is controlled in accordance with the corrected intake air amount. In the speed-density control, the fuel injection pulse width is controlled based on an engine speed and an intake air weight. That is, in the speed-density control, an intake pressure generated in an intake stroke is measured, and the supply amount of fuel is decided based on the measurement value. It is therefore necessary to accurately measure the intake pressure. Each of Japanese Patent Laid-Open No. 2009-191712 and Japanese Patent Laid-Open No. 2009-191713 proposes estimating a bottom pressure that is an intake pressure near the bottom dead center based on the detection value of the pressure at the point of time immediately before the bottom before the point of time of the bottom dead center.

By the way, the timing at which the bottom pressure of a single cylinder engine is generated changes depending on the engine speed or engine load. It is therefore impossible to correctly estimate the bottom pressure by measuring the intake pressure at a predetermined point as in the conventional technique.

SUMMARY OF THE INVENTION

The present invention provides an intake pressure detection apparatus comprising: an intake pressure sensor provided in an intake path of a single cylinder engine and configured to detect an intake pressure; a crank angle sensor configured to detect a crank angle of the single cylinder engine; a sampling unit configured to sample the intake pressure detected by the intake pressure sensor when the crank angle detected by the crank angle sensor becomes a sampling start angle; and a calculation unit configured to extract M intake pressures of relatively small values of N intake pressures sampled by the sampling unit and acquire, as a bottom pressure, an average value of P intake pressures remaining after several intake pressures of relatively large values and several intake pressures of relatively small values of the M intake pressures are excluded.

The present invention further provides an intake pressure detection apparatus comprising: an intake pressure sensor provided in an intake path of a single cylinder engine and configured to detect an intake pressure; a sampling unit configured to sample the intake pressure detected by the intake pressure sensor in an intake stroke of the single cylinder engine; and a calculation unit configured to extract M intake pressures of relatively small values of N intake pressures sampled by the sampling unit and acquire, as a bottom pressure, an average value of P intake pressures remaining after several intake pressures of relatively large values and several intake pressures of relatively small values of the M intake pressures are excluded.

The present invention further provides an electronically controlled fuel supply apparatus comprising: an intake pressure sensor provided in an intake path of a single cylinder engine and configured to detect an intake pressure; a crank angle sensor configured to detect a crank angle of the single cylinder engine; a sampling unit configured to sample the intake pressure detected by the intake pressure sensor when the crank angle detected by the crank angle sensor becomes a sampling start angle; a calculation unit configured to extract M intake pressures of relatively small values of N intake pressures sampled by the sampling unit and acquire, as a bottom pressure, an average value of P intake pressures remaining after several intake pressures of relatively large values and several intake pressures of relatively small values of the M intake pressures are excluded; a decision unit configured to decide an injection amount of fuel to implement a predetermined air fuel ratio based on the average value of the intake pressures obtained by the calculation unit; and an injector configured to inject the fuel in the injection amount decided by the decision unit.

Further features of the present invention will become apparent from the following description of exemplary embodiments (with reference to the attached drawings).

BRIEF DESCRIPTION OF THE DRAWINGS

FIG. 4 is a view for explaining the relationship between an engine stroke, a crank signal, and an intake pressure;
and
FIGS. 5A and 5B are views showing the relationship between a bottom pressure and a crank angle.

DESCRIPTION OF THE EMBODIMENTS

First Embodiment

Figure 1:
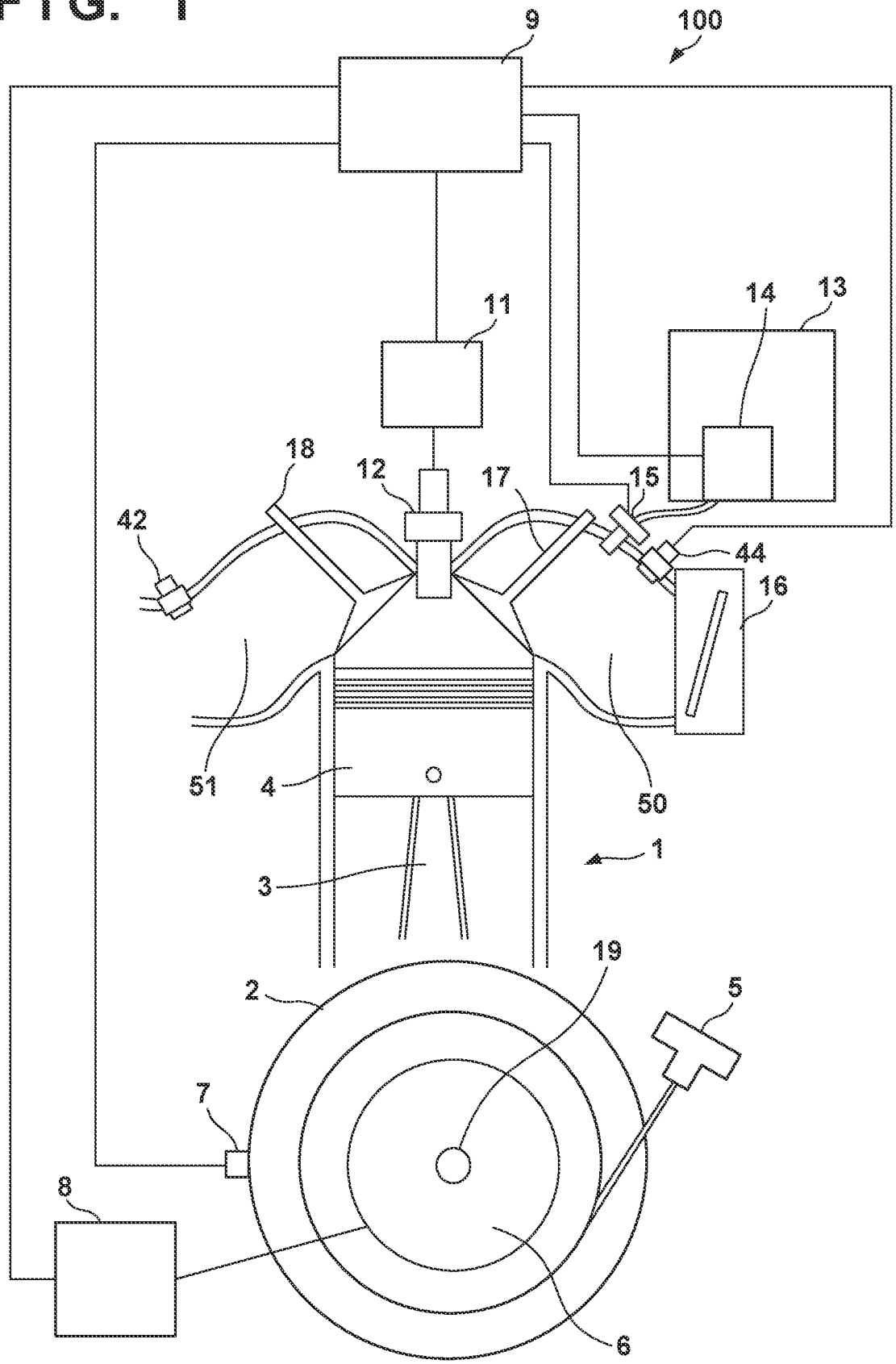
FIG. 1 is a schematic view showing an engine system.

<Engine System>
FIG. 1 is a schematic view showing an engine system 100. The engine system 100 may be called an electronically controlled fuel injection control system. An internal combustion engine 1 is a 4-stroke engine. A crankshaft 19 is stored in a crankcase 2. When the crankshaft 19 rotates, a piston 4 connected to a connecting rod 3 moves in the vertical direction in a cylinder. A recoil starter 5 used to start the internal combustion engine 1 is connected to the crankshaft 19. A recoil operator grasps and pulls the handle of the recoil starter 5, thereby rotating the crankshaft 19. A generator 6 is connected to the crankshaft 19. When the crankshaft 19 rotates, the rotor of the generator 6 rotates and generates power. Note that the generator 6 and a power supply circuit 8 are options. The crank angle of the crankshaft 19 is detected by a crank angle sensor 7. The crank angle sensor 7 may be, for example, a Hall element configured to detect the magnetism of a magnet provided on a flywheel connected to the crankshaft 19. The detection result of the crank angle sensor 7 may be used to calculate the engine speed. The power supply circuit 8 includes an inverter that converts an AC generated by the generator 6 into an AC of a predetermined frequency, a circuit that converts the AC into a DC, a circuit that converts the level of the DC voltage, and the like. The power supply circuit 8 supplies the power generated by the generator 6 to a control unit 9. Note that when the crankshaft 19 is rotated by the recoil starter 5, the generator 6 generates sufficient power for the control unit 9 to operate. The control unit 9 is an engine control unit (ECU) and controls the power supplied from the power supply circuit 8 to an ignition device 11, a fuel pump 14, an injector 15, a throttle motor 16, and the like. The ignition device 11 supplies ignition power to cause a spark plug 12 to cause spark discharge. A fuel tank 13 is a container that stores fuel. The fuel pump 14 is a pump that supplies fuel stored in the fuel tank 13 to the injector 15. Referring to FIG. 1, the fuel pump 14 is provided in the fuel tank. The throttle motor 16 is a motor configured to control the inflow amount of air flowing into the cylinder via an intake path 50. An intake valve 17 is a valve to be opened/closed by a cam configured to convert the rotary motion of the crankshaft 19 into a vertical motion, and the like. The intake valve 17 is opened in the intake stroke and is basically closed in a compression stroke, an expansion stroke, and an exhaust stroke. An exhaust valve 18 is a valve to be opened/closed by a cam configured to convert the rotary motion of the crankshaft 19 into a vertical motion, and the like. The exhaust valve 18 is opened in the exhaust stroke and is basically closed in the compression stroke, the expansion stroke, and the intake stroke. For smooth transition from exhaust to intake, a period in which the intake valve 17 and the exhaust valve 18 are simultaneously opened may be provided (overlap). An intake pressure sensor 44 is a sensor that is provided in the intake path 50 of the single cylinder engine and detects an intake pressure. An $O_2$ sensor 42 is a sensor that detects an oxygen concentration in an exhaust gas discharged from the cylinder to an exhaust path 51. The control unit 9 may obtain an air fuel ratio from the oxygen concentration.

<Control Unit and Power Supply Circuit>

Figure 2:
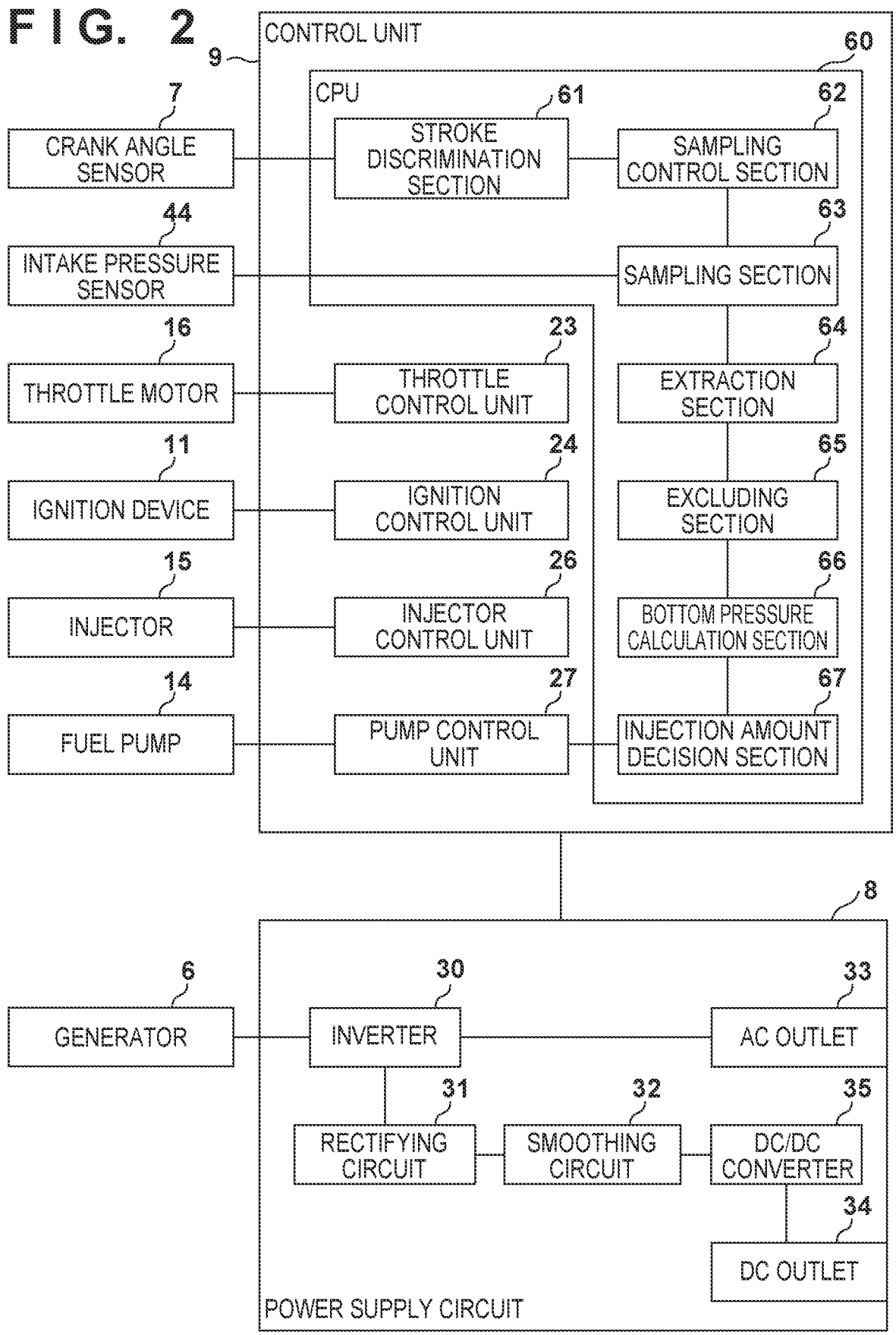
FIG. 2 is a block diagram showing a control unit and a power supply circuit.

FIG. 2 shows the function of the control unit 9 and the function of the power supply circuit 8. The function of the control unit 9 may be implemented by hardware such as an ASIC or FPGA, or may be implemented by executing a control program stored in a memory by a CPU 60. ASIC is an abbreviation for an application specific integrated circuit. FPGA is an abbreviation for a field programmable gate array. CPU is an abbreviation for a central processing unit.

The CPU 60 sets the control parameters of the internal combustion engine 1. The CPU 60 controls the throttle motor 16 via a throttle control unit 23 to adjust the inflow amount of air. The engine speed is thus controlled. The CPU 60 controls the ignition device 11 via an ignition control unit 24. The ignition control unit 24 adjusts the advance of the ignition period based on the detection result of the crank angle sensor 7. The CPU 60 may convert the detection result of the $O_2$ sensor 42 into an air fuel ratio, drive the fuel pump 14 via a pump control unit 27, and adjust the supply amount of fuel such that the air fuel ratio becomes a target air fuel ratio. The engine system 100 according to this embodiment cannot directly discriminate the stroke because it does not include a cam sensor. Hence, a stroke discrimination section 61 may discriminate the engine stroke based on the detection result of the crank angle sensor 7 and control the injection timing of the injector 15 via an injector control unit 26 in accordance with the engine stroke. A sampling control section 62 controls the timing at which a sampling section 63 samples the intake pressure detected by the intake pressure sensor 44. For example, the sampling control section 62 operates the sampling section 63 in the intake stroke. The sampling section 63 starts sampling when the sampling control section 62 outputs a permission signal, and ends sampling when the sampling control section 62 outputs a stop signal (stops output of the permission signal). Accordingly, N sampling values are obtained. An extraction section 64 extracts M sampling values from the N sampling values. For example, when the sampling period of the sampling section 63 is 100 microseconds, the extraction section 64 extracts 10 relatively small sampling values (intake pressures) (M=10). This is because the bottom pressure is the minimum intake pressure. An excluding section 65 extracts P sampling values from the M sampling values. For example, the excluding section 65 deletes several relatively large sampling values (example: maximum value) and several relatively small sampling values (example: minimum value) of the M sampling values, thereby extracting P sampling values. A bottom pressure calculation section 66 calculates the bottom pressure based on the P sampling values. An injection amount decision section 67 decides the supply amount (injection amount) of the fuel based on the bottom pressure and sets it to the pump control unit 27.

In the power supply circuit 8, an inverter 30 is a conversion circuit that converts an AC generated by the generator 6 into an AC of a predetermined frequency. A rectifying circuit 31 is a circuit that rectifies the AC generated by the AC generated by the generator 6. A smoothing circuit 32 is a circuit that generates a DC by smoothing the pulsating current generated by the rectifying circuit 31. Accordingly, a DC voltage of, for example, 12 V is generated. The control unit 9 may PWM-control the power supplied to the fuel pump 14 in accordance with the load of the generator 6 or the internal combustion engine 1. A DC/DC converter 35 is a circuit that converts the level of the DC voltage. For example, the DC/DC converter 35 converts the DC voltage of 12 V into a DC voltage of 5 V or 3.3 V. The DC/DC converter 35 supplies the DC voltage from a DC outlet 34 to an external load.

<Flowchart>

Figure 3:
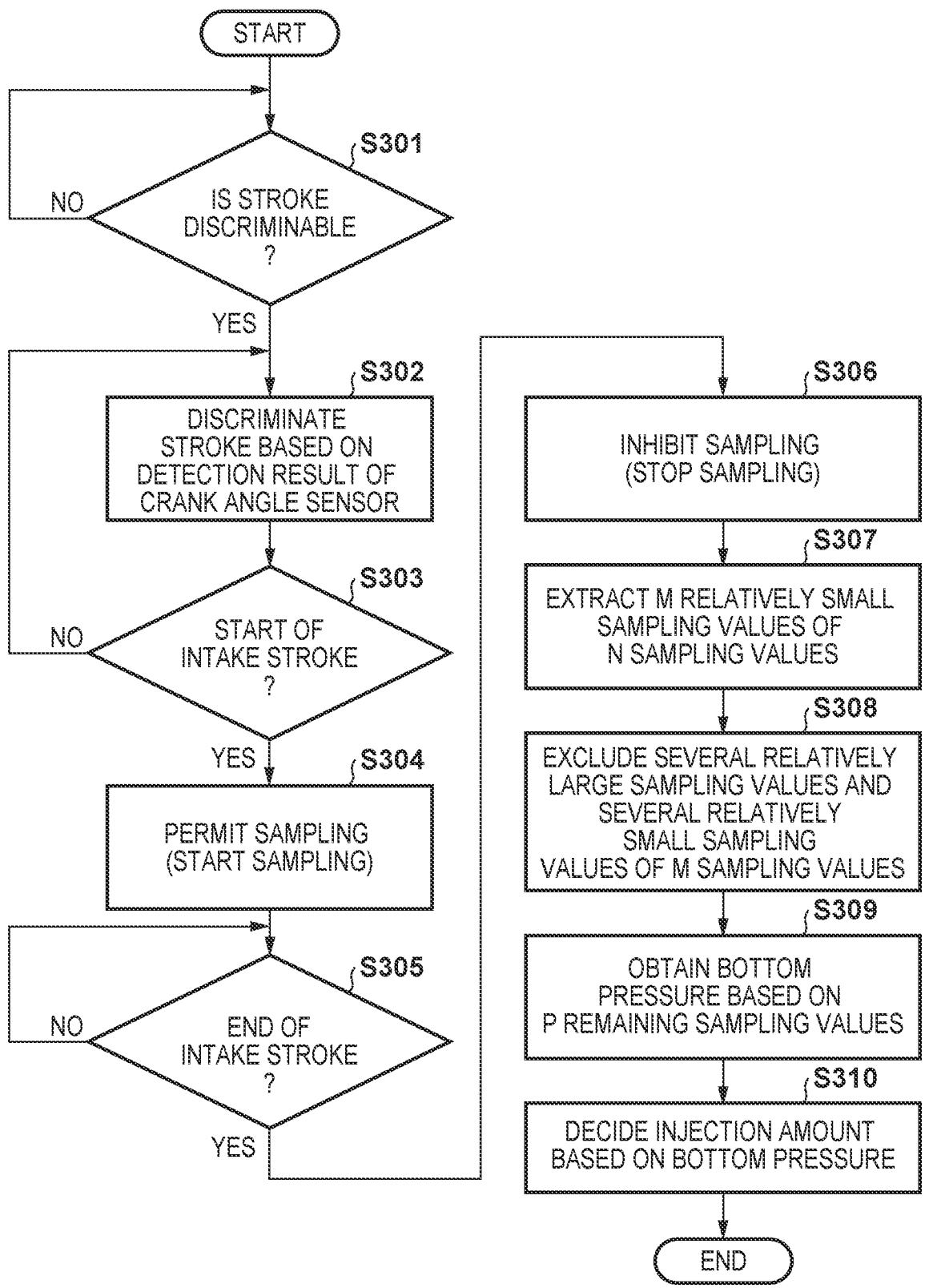
FIG. 3 is a flowchart showing a bottom pressure detection method.

FIG. 3 is a flowchart showing a bottom pressure detection method. FIG. 4 is a view showing the relationship between the stroke of the internal combustion engine 1, a crank signal output from the crank angle sensor 7, and an intake pressure detected by the intake pressure sensor 44.

In step S301, the CPU 60 (stroke discrimination section 61) determines whether the engine stroke can be discriminated based on the crank signal. A 4-cycle engine has an intake stroke, a compression stroke, an expansion stroke, and an exhaust stroke. That is, the four strokes are executed when the crankshaft 19 makes two revolutions. In the crank angle sensor 7, at least one magnet of a plurality of magnets arranged at equal intervals in the rotation direction of the crankshaft 19 lacks (chipped tooth). The Hall element of the crank angle sensor 7 outputs a pulse when a magnet passes. In the section where the magnet lacks, the Hall element does not output a pulse. That is, while the crankshaft 19 makes one revolution, a period where no pulse is generated occurs. In the crank signal shown in FIG. 4, no pulse is generated at the timing to start the intake stroke. Accordingly, the stroke discrimination section 61 can discriminate the intake stroke. That is, the intake stroke starts after nine pulses are generated. Here, the expansion stroke also starts after nine pulses are generated. Hence, it appears that the intake stroke and the expansion stroke cannot be discriminated. However, the stroke discrimination section 61 can distinguish the intake stroke from the expansion stroke by comparing times ta and tb between the eighth pulse and the ninth pulse. That is, the force applied to the piston 4 in the exhaust stroke is smaller than the force applied to the piston 4 in the compression stroke. That is, the time ta is shorter than the time tb. For example, if a time t between the eighth pulse and the ninth pulse is shorter than a threshold tth, the stroke discrimination section 61 can discriminate that the intake stroke starts. Additionally, if the time t is not less than the threshold tth, the stroke discrimination section 61 can discriminate that the expansion stroke starts. However, at the start of the internal combustion engine 1, the stroke discrimination section 61 cannot identify the intake stroke and the expansion stroke because the difference between the time ta and the time tb is small. Hence, if the difference between the time ta and the time tb is too small, that is, at the start of the internal combustion engine 1, the stroke discrimination section 61 determines that the stroke cannot be identified. On the other hand, when the difference between the time ta and the time tb sufficiently becomes large (that is, when the internal combustion engine 1 ends starting and starts a self-sustained rotation), the stroke discrimination section 61 determines that the stroke can be discriminated, and advances to step S302.

In step S302, the CPU 60 (stroke discrimination section 61) discriminates (identifies) the stroke based on the crank signal. The CPU 60 (stroke discrimination section 61) may specify the crank angle (0° to 720°) based on the crank signal and identify the stroke based on the crank angle.

In step S303, the CPU 60 (stroke discrimination section 61) determines based on the crank signal whether the intake stroke is started. If the time t between the eighth pulse and the ninth pulse has a length that means the intake stroke, the stroke discrimination section 61 determines that the intake stroke is started, and advances to step S304. If the time t between the eighth pulse and the ninth pulse does not have the length that means the intake stroke, the stroke discrimination section 61 determines that the intake stroke is not started, and returns to step S302. Note that when the crank angle detected by the crank angle sensor 7 becomes a sampling start angle, the stroke discrimination section 61 or the sampling control section 62 may start sampling. This is because the number of pulses represents the crank angle.

In step S304, the CPU 60 (sampling control section 62) outputs a sampling permission signal (start signal) to the sampling section 63 and causes the sampling section 63 to start sampling of the intake pressure. The sampling section 63 samples the intake pressure output from the intake pressure sensor 44 at a sampling period of 100 μs or less. μs represents microsecond.

In step S305, the CPU 60 (stroke discrimination section 61) discriminates based on the crank signal whether the intake stroke ends. As shown in FIG. 4, the intake stroke ends when the fourth pulse is output after the chipped tooth period. Hence, the stroke discrimination section 61 counts the number of pulses and, upon detecting the fourth pulse, determines that the intake stroke ends. Note that instead of determining the end of the intake stroke, the CPU 60 may determine whether the number of sampling values is N. Here, the product of N and the sampling period is set to be much longer than the time in which a negative pressure is generated in the intake stroke. This prevents the bottom pressure measurement from being missed. When the intake stroke ends (when the N sampling values are acquired), the CPU 60 advances to step S306.

In step S306, the CPU 60 (sampling control section 62) inhibits (stops) sampling. For example, the sampling control section 62 stops output of the sampling permission signal or outputs a sampling inhibition signal (non-permission signal) to the sampling section 63.

In step S307, the CPU 60 (extraction section 64) extracts M relatively small sampling values from N sampling values (intake pressures) sampled by the sampling section 63 (example: M=10). Here, the bottom pressure is a particularly relatively small value. Hence, the M relatively small intake pressures of the N intake pressures are extracted.

In step S308, the CPU 60 (excluding section 65) excludes several relatively large sampling values and several relatively small sampling values of the M sampling values. Accordingly, a noise component is removed. For example, the excluding section 65 acquires the average value of P intake pressures remaining after the maximum value and the minimum value are excluded from the M intake pressures (example: M=10, P=8).

In step S309, the CPU 60 (extraction section 64) obtains the bottom pressure based on the P sampling values. For example, the extraction section 64 acquires the average value of the P intake pressures as the bottom pressure.

In step S310, the CPU 60 (injection amount decision section 67) decides the injection amount (the supply amount of the fuel) based on the bottom pressure and sets it to the pump control unit 27. The pump control unit 27 operates the fuel pump 14 only for a time corresponding to the injection amount.

<Variations in Position of Bottom Pressure>

FIGS. 5A and 5B show crank angles a1 and a2 at which bottom pressures according to the difference in the structure of the internal combustion engine 1 are obtained. FIG. 5A shows the relationship between the intake pressure and the crank signal of the internal combustion engine 1 mounted in the first finished product. In FIG. 5A, when the crank angle is a1, the bottom pressure is generated. FIG. 5B shows the relationship between the intake pressure and the crank signal of the internal combustion engine 1 mounted in the second finished product. In FIG. 5B, when the crank angle is a2, the bottom pressure is generated. That is, the crank angles have an angle difference Δ.

The crank angle at which the bottom pressure is obtained changes in accordance with the engine speed or load. In addition, the crank angle changes in accordance with the operation timing of the intake valve 17, the operation timing of the exhaust valve 18, the ignition timing, the attachment position of the intake pressure sensor 44, the shape of a tube to which the intake pressure sensor 44 is attached, and the like. For example, if the shape of the tube to which the intake pressure sensor 44 is attached changes due to the difference in the manufacturing lot, a conventional ECU needs to change the crank angle to detect the bottom pressure. Additionally, if the internal combustion engine 1 is a general-purpose engine, the finished product (example: generator, lawn mower, or agricultural machine) in which the internal combustion engine 1 is mounted may change. In this case, since the load applied to the internal combustion engine 1 changes, the crank angle to detect the bottom pressure needs to be adjusted for each finished product.

On the other hand, this embodiment reduces a load on the designer of the ECU, a load in manufacturing, and a load in maintenance. That is, in this embodiment, intake pressures are detected in correspondence with crank angles in a wide range including the crank angle at which the bottom pressure can be generated, and the bottom pressure is specified from the detected intake pressures. That is, the designer of the ECU need not set or adjust the bottom pressure detection timing for each finished product.

SUMMARY

The internal combustion engine 1 is an example of a single cylinder engine. The intake pressure sensor 44 is an example of an intake pressure sensor provided in the intake path 50 of the single cylinder engine and configured to detect the intake pressure. The crank angle sensor 7 is an example of a crank angle sensor configured to detect the crank angle of the single cylinder engine. The sampling section 63 is an example of a sampling unit configured to sample the intake pressure detected by the intake pressure sensor 44 when the crank angle detected by the crank angle sensor 7 becomes the sampling start angle. The CPU 60 is an example of a calculation unit configured to extract the M intake pressures of relatively small values of the N intake pressures sampled by the sampling section 63 and acquire the average value of P intake pressures remaining after several intake pressures of relatively large values and several intake pressures of relatively small values of the M intake pressures are excluded. This makes it possible to accurately detect the intake pressure of the single cylinder engine.

The CPU 60 may acquire the average value of P intake pressures remaining after the maximum value and the minimum value of the M intake pressures are excluded. This is because the maximum value and the minimum value may be errors.

The sampling section 63 samples the intake pressure in the intake stroke of the single cylinder engine.

The stroke discrimination section 61 is an example of an identification unit configured to identify the intake stroke of the single cylinder engine based on an output signal output from the crank angle sensor 7. When the crank angle detected by the crank angle sensor 7 becomes the sampling start angle in the identified intake stroke, the sampling section 63 starts sampling of the intake pressure detected by the intake pressure sensor 44. Accordingly, since the intake pressure is detected in the intake stroke but not in the remaining strokes, the capacity of the memory that holds the sampling values can be reduced.

The sampling control section 62 is an example of a control unit configured to not to permit the sampling section 63 to sample the intake pressure until the stroke discrimination section 61 becomes able to identify the intake stroke of the single cylinder engine and permit the sampling section 63 to sample the intake pressure when the stroke discrimination section 61 has become able to identify the intake stroke of the single cylinder engine. The stroke discrimination section 61 performs stroke discrimination using the crank angle sensor 7 and therefore cannot execute the stroke discrimination at the start of the internal combustion engine 1. For this reason, the sampling control section 62 permits the sampling section 63 to sample the intake pressure when the stroke discrimination section 61 has become able to identify the intake stroke of the single cylinder engine. This makes it possible to accurately detect the bottom pressure. As described above, the sampling section 63 does not sample the intake pressure at the start of the single cylinder engine.

Note that the crank angle sensor 7 may be omitted. In this case, the sampling section 63 may execute sampling in all strokes. The CPU 60 extracts the M intake pressures of relatively small values of the N sampled intake pressures and acquires the average value of P intake pressures remaining after several intake pressures of relatively large values and several intake pressures of relatively small values of the M intake pressures are excluded. As shown in FIG. 4, a negative pressure is not generated in the strokes other than the intake stroke. That is, the negative pressure is generated only in the intake stroke. Hence, the CPU 60 can extract the M intake pressures of relatively small values of the N intake pressures.

A portion of the engine system 100 except the internal combustion engine 1 is an electronically controlled fuel supply apparatus that supplies fuel to the single cylinder engine. FIG. 2 shows an intake pressure detection apparatus. The injection amount decision section 67 is an example of a decision unit configured to decide the injection amount of fuel to implement a predetermined air fuel ratio based on the average value of intake pressures obtained by the bottom pressure calculation section 66. In addition, the CPU 60 is an example of an injection amount control unit configured to execute speed-density control based on the injection amount of the fuel decided by the injection amount decision section 67.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An intake pressure detection apparatus comprising:
   an intake pressure sensor provided in an intake path of a single cylinder engine and configured to detect an intake pressure;
   a crank angle sensor configured to detect a crank angle of the single cylinder engine;
   a sampling unit configured to sample the intake pressure detected by the intake pressure sensor when the crank angle detected by the crank angle sensor becomes a sampling start angle; and
   a calculation unit configured to extract M intake pressures of relatively small values of N intake pressures sampled by the sampling unit and acquire, as a bottom pressure, an average value of P intake pressures remaining after several intake pressures of relatively large values and several intake pressures of relatively small values of the M intake pressures are excluded.

2. The apparatus according to claim 1, wherein the calculation unit acquires the average value of the P intake pressures remaining after a maximum value and a minimum value of the M intake pressures are excluded.

3. The apparatus according to claim 1, wherein the sampling unit samples the intake pressure in an intake stroke of the single cylinder engine.

4. The apparatus according to claim 3, further comprising an identification unit configured to identify the intake stroke of the single cylinder engine based on an output signal output from the crank angle sensor,
   wherein when the crank angle detected by the crank angle sensor becomes the sampling start angle in the intake stroke identified by the identification unit, the sampling unit starts sampling of the intake pressure detected by the intake pressure sensor.

5. The apparatus according to claim 4, further comprising a sampling control unit configured to not to permit the sampling unit to sample the intake pressure until the identification unit becomes able to identify the intake stroke of the single cylinder engine and permit the sampling unit to sample the intake pressure when the identification unit has become able to identify the intake stroke of the single cylinder engine.

6. The apparatus according to claim 1, wherein the sampling unit does not sample the intake pressure at a start of the single cylinder engine.

7. An intake pressure detection apparatus comprising:
an intake pressure sensor provided in an intake path of a single cylinder engine and configured to detect an intake pressure;
a sampling unit configured to sample the intake pressure detected by the intake pressure sensor in an intake stroke of the single cylinder engine; and
a calculation unit configured to extract M intake pressures of relatively small values of N intake pressures sampled by the sampling unit and acquire, as a bottom pressure, an average value of P intake pressures remaining after several intake pressures of relatively large values and several intake pressures of relatively small values of the M intake pressures are excluded.

8. An electronically controlled fuel supply apparatus comprising:
an intake pressure sensor provided in an intake path of a single cylinder engine and configured to detect an intake pressure;
a crank angle sensor configured to detect a crank angle of the single cylinder engine;
a sampling unit configured to sample the intake pressure detected by the intake pressure sensor when the crank angle detected by the crank angle sensor becomes a sampling start angle;
a calculation unit configured to extract M intake pressures of relatively small values of N intake pressures sampled by the sampling unit and acquire, as a bottom pressure, an average value of P intake pressures remaining after several intake pressures of relatively large values and several intake pressures of relatively small values of the M intake pressures are excluded;
a decision unit configured to decide an injection amount of fuel to implement a predetermined air fuel ratio based on the average value of the intake pressures obtained by the calculation unit; and
an injector configured to inject the fuel in the injection amount decided by the decision unit.

9. The apparatus according to claim 8, further comprising an injection amount control unit configured to execute speed-density control based on the injection amount of the fuel decided by the decision unit.

* * * * *